(12) United States Patent
Wang

(10) Patent No.: US 6,702,317 B2
(45) Date of Patent: Mar. 9, 2004

(54) APPARATUS FOR TEMPORARILY RETAINING A COMPONENT WITHIN A VEHICLE PASSENGER COMPARTMENT

(75) Inventor: Min Wang, Troy, MI (US)

(73) Assignee: General Motors Corporation, Detroit, MI (US)

(*) Notice: Subject to any disclaimer, the term of this patent is extended or adjusted under 35 U.S.C. 154(b) by 14 days.

(21) Appl. No.: 10/160,936

(22) Filed: May 31, 2002

(65) Prior Publication Data

US 2003/0222433 A1 Dec. 4, 2003

(51) Int. Cl.$^7$ ................ B60R 11/06; B62D 43/06
(52) U.S. Cl. ..................... 280/727; 224/42.18
(58) Field of Search .............. 280/727; 119/771; 224/42.12, 42.18

(56) References Cited

U.S. PATENT DOCUMENTS

| | | | | |
|---|---|---|---|---|
| 3,712,586 A | * | 1/1973 | Nicholson | 254/1 |
| 3,823,857 A | * | 7/1974 | Yandt | 224/42.24 |
| 3,831,370 A | * | 8/1974 | Gilmore | 57/215 |
| 3,865,264 A | * | 2/1975 | Kuhns | 414/463 |
| RE29,348 E | * | 8/1977 | Bott | 224/42.12 |
| 4,117,963 A | * | 10/1978 | Luczynski | 224/318 |
| 4,221,528 A | * | 9/1980 | Gordos | 414/540 |
| 4,600,352 A | * | 7/1986 | Ivan | 414/463 |
| 5,215,232 A | * | 6/1993 | Wyers | 224/42.13 |
| 5,718,190 A | * | 2/1998 | Tinker | 119/771 |
| 6,009,922 A | * | 1/2000 | Gogan | 152/218 |
| 6,155,323 A | * | 12/2000 | Gougelet | 157/1 |
| 6,533,340 B1 | * | 3/2003 | Gaunzon et al. | 296/37.16 |

* cited by examiner

*Primary Examiner*—Son T Nguyen
(74) *Attorney, Agent, or Firm*—Laura C. Hargitt

(57) ABSTRACT

An apparatus for temporarily retaining a component within a vehicle passenger compartment includes a cable having opposed ends with hooks for attaching the ends of the cable to corresponding attachment points within the vehicle passenger compartment. The cable passes through an opening in the component and a portion of the cable is attached to another of the attachment points, whereby the cable is placed under tension and retains the component in the passenger compartment.

7 Claims, 4 Drawing Sheets

APPARATUS FOR TEMPORARILY RETAINING A COMPONENT WITHIN A VEHICLE PASSENGER COMPARTMENT

BACKGROUND OF THE INVENTION

The present invention relates generally to storage and retaining devices for use in automotive vehicles and, in particular, to an apparatus for temporarily retaining a component within a vehicle passenger compartment.

Large components, such as vehicle spare tire and wheel assemblies, are typically carried outside the vehicle or in a location in the vehicle interior that maximizes interior storage space. Geometry constraints often make it difficult if not impossible to place a flat road wheel and tire outside the passenger space of the vehicle where the spare tire is normally carried. As a result, the flat tire and wheel is often stowed temporarily in the vehicle interior.

Any original vehicle equipment, such as the flat road wheel and tire, that is required to be stowed in the vehicle interior, even temporarily, must be provided with a retaining device. Various regulations require that the retaining device must be able to withstand the loads experienced in a 30 mph frontal barrier test without separating from the vehicle or from the stowed equipment. A typical prior art means for temporarily positioning and retaining a flat tire and wheel inside a vehicle is the use of a J-bolt, wing nut and D-ring retaining assembly to bolt the wheel to a mounting surface such as the vehicle floor, the side panel or the back of the rear seat. In addition to the bolt, nut, and ring retaining assembly, additional structures, such as heavy permanent brackets, are often required at the mounting surface to support the mass of the retaining device, tire and wheel. In some vehicles, a retaining assembly is occasionally required that will allow the flat wheel and tire assembly to be oriented vertically, which requires additional robust structures, which disadvantageously increase the weight of the vehicle.

It is desirable, therefore, to provide a means for temporarily retaining a component, such as a flat road tire and wheel, safely within the passenger compartment that can utilize existing attachment points in the vehicle without the use of heavy, permanent brackets and that is economical, lightweight, and easy to use for the average consumer. It is also desirable to provide a means for temporarily retaining a component safely within the passenger compartment that is economical to produce and easy to use for the average consumer and that is aesthetically pleasing and easy to store when not in use. It is also desirable to provide an apparatus for temporarily retaining a component safely within the passenger compartment that allows the component to be oriented vertically within the passenger compartment.

SUMMARY OF THE INVENTION

The present invention concerns an apparatus for retaining a component within a vehicle passenger compartment. The present invention includes at least one cable having opposed ends. Each of the opposed ends of the cable includes a means for attaching mounted thereon. The cable is preferably constructed of rigid steel aircraft-type cable, or a cable of similar strength, quality, and flexibility. The means for attaching is preferably a hook, clip, or the like. The cable and means for attaching are preferably of sufficient strength to withstand the loads without separating from the vehicle or from the stowed component. The cable is preferably of a sufficient length to attach to at least two attachment points within the vehicle interior while still maintaining a tension on the component sufficient to retain the component from moving significantly during vehicle operation. Preferably, a portion of the cable is also adapted to conform to another attachment point, providing at least three attachment points to retain the component. The means for attaching is preferably adapted to attach to the component to which it is to be attached, such as by passing through an aperture in the component, and to the attachment points for the vehicle to which it is installed. Alternatively, the present invention includes a plurality of cables, each of the cables having a means for attaching on each opposed end of the cable.

In operation, the component is placed in the vehicle interior, the cable is attached to or passed through the component, and each of the opposed ends of the cable extended towards the attachment points. The attachment means and the portion of the cable that is adapted to conform to an attachment point are then attached to the attachment points, tensioning the cable and securing the component within the vehicle interior.

In a preferred embodiment, the component is a flat road wheel that is oriented vertically in the cargo area of the passenger compartment adjacent a lift gate. The cable passes through a door striker for the lift gate and the center of the wheel and the attachment means are hooks that attach to the two lift gate hinges.

The present invention advantageously supports and contains the flat road wheel inside the vehicle without adding any structure or support hardware. The present invention advantageously utilizes existing vehicle structures and hardware and does not require any change on the production parts on the vehicle or additional reinforcement to accommodate the road wheel stowage. The present invention is easy to use and advantageously works for all size wheels and with or without a tire on the wheel. The present invention provides a lighter weight and cheaper solution than other bracket-based systems, advantageously stows out of sight when not in use, and eliminates the need for permanent brackets or hardware. The present invention uses fewer parts and weighs significantly less than a comparable prior art bolt down retaining assembly.

The present invention advantageously provides a lightweight solution for stowing flat tire and wheel assemblies safely until the flat can be repaired.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
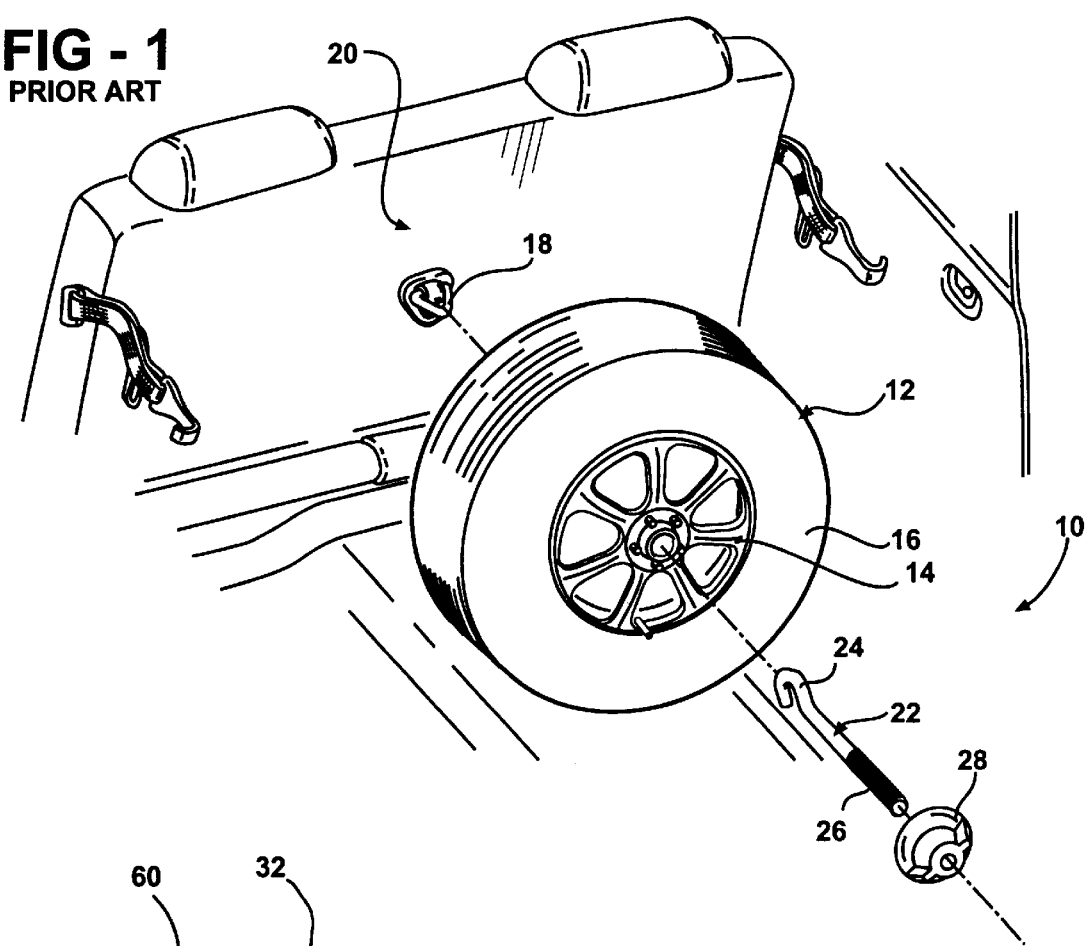
FIG. 1 is a perspective view of a prior art retaining apparatus.

Referring now to FIG. 1, a retaining means according to the prior art is indicated generally at 10. The retaining means 10 is adapted to retain a vehicle wheel assembly 12 in a substantially vertical orientation while resting on a floor surface in the interior of a vehicle. The wheel assembly 12 includes a wheel 14 having a tire 16 mounted on the circumference thereof. The retaining means 10 includes a D-ring 18 attached to a mounting surface 20 in the vehicle interior, such as the back of the rear seat. A J-bolt 22 having a hook portion 24 and a threaded shank portion 26 passes through the center aperture of the wheel assembly 12. The hook portion 24 of the J-bolt 22 attaches to the D-ring 18. A nut 28 threadably attaches to the shank portion 26 of the J-bolt 22 and retains the wheel assembly 12 to the mounting surface 20 with the wheel assembly resting on the floor of the vehicle interior.

Figure 2:
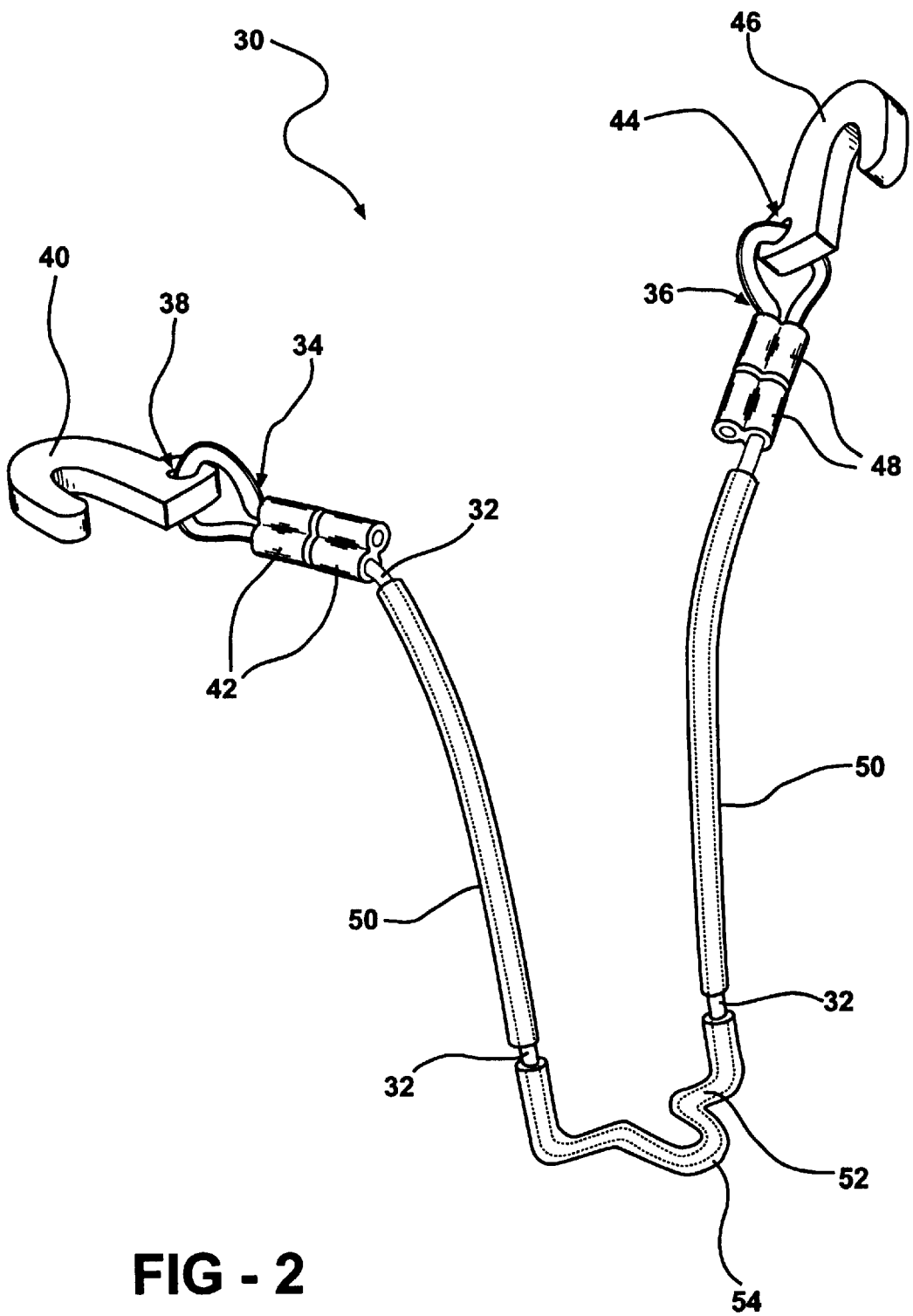
FIG. 2 is a perspective view of a retaining apparatus in accordance with the present invention.

Referring now to FIG. 2, a retaining apparatus in accordance with the present invention is indicated generally at 30. The retaining apparatus 30 includes an elongated cable 32 having a first end 34 and a second end 36. The cable 32 is preferably constructed of rigid steel aircraft-type cable, or a cable of similar strength, quality, and flexibility. The first end 34 passes through an aperture 38 in a first hook 40 and is attached to itself by a plurality of cable clamps 42, attaching the first hook 40 to the cable 32. The second end 36 passes through an aperture 44 in a second hook 46 and is attached to itself by a plurality of cable clamps 48, attaching the second hook 46 to the cable 32. The hooks 40 and 46 are operable to be attached to attachment points, outlined in more detail below. The cable 32 has a substantial length thereof enclosed by a pair of flexible sheaths 50. The sheaths 50 are preferably constructed of tubular transparent plastic and provide a less harsh surface which the user of the retaining apparatus 30 can grasp in manipulating the retaining apparatus 30 to attach the hooks 40 and 46 to attachment points in the vehicle, outlined in more detail below. Alternatively, the sheaths 50 are a plastic coating that adheres to the exterior surface of the cable 32 and provides a less harsh surface which the user of the retaining apparatus 30 can grasp in manipulating the retaining apparatus 30 to attach the hooks 40 and 46 to attachment points in the vehicle.

The cable 32 includes a central portion 52 that is encased in an opaque tubular covering or shroud 54. The central portion 52 and the covering 54 are operable to attach to an attachment point, outlined in more detail below, within the vehicle interior. The covering 54 is preferably constructed of a rigid plastic material for facilitating the attachment of the central portion 52 and covering 54 to the attachment point.

Figure 4:
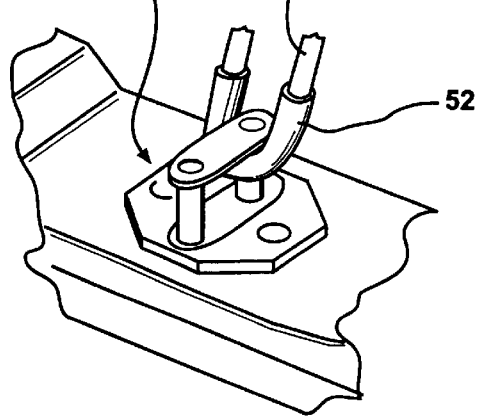
FIG. 4 is an enlarged view of the encircled portion 4 of FIG. 3 showing the cable attached to an attachment point in the vehicle passenger compartment.
Figure 5:
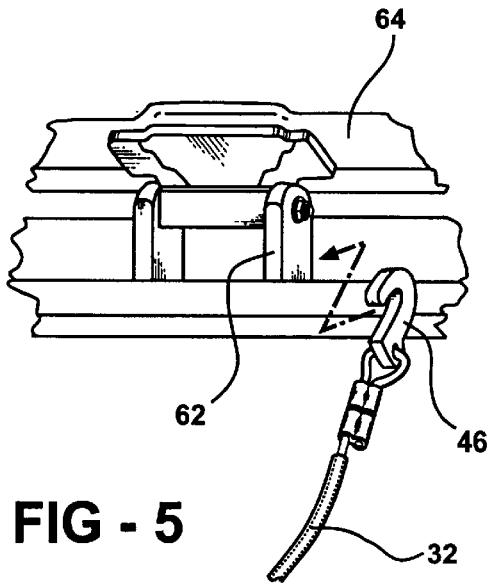
FIG. 5 is an enlarged view of the encircled portion 5 of FIG. 3 showing an attachment means of the cable attached to another attachment point in the vehicle passenger compartment.
Figure 3:
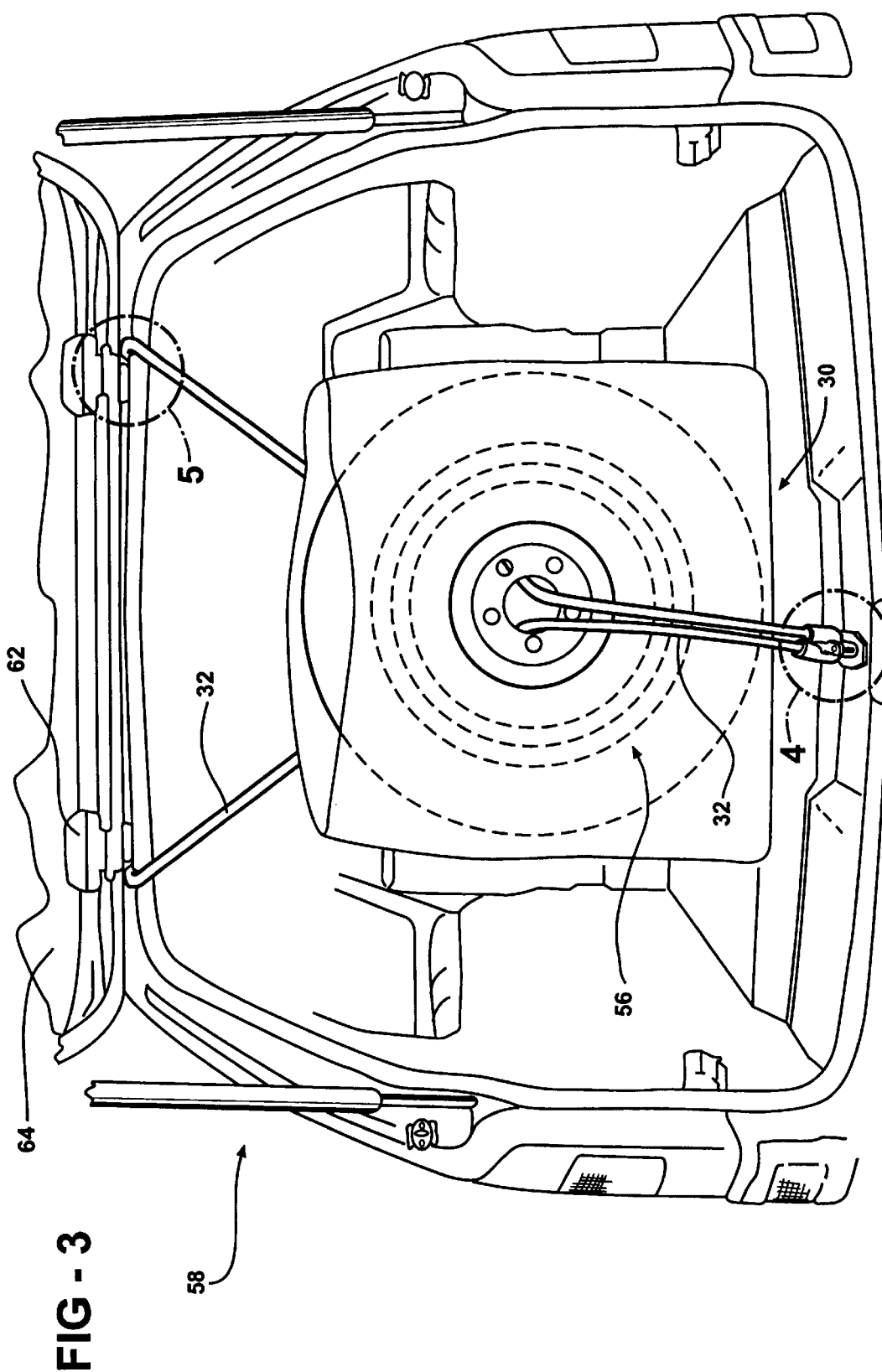
FIG. 3 is a perspective view of the apparatus of FIG. 2 shown attached to a vehicle passenger compartment.

Referring now to FIGS. 3–5, the retaining apparatus 30 is shown retaining a vehicle wheel assembly 56 in a vehicle passenger compartment, indicated generally at 58, while the wheel assembly rests on the floor in a vertical orientation. The central portion 52 of the cable 32 is doubled over to form a loop and the loop is passed through the center aperture or axle opening of the wheel assembly 56, such that the central portion 52 is on the rearward facing side of the wheel and the hooks 40 and 46 are on the forward facing side of the wheel. The central portion 52 extends through and is retained by a door striker 60, best seen in FIG. 4. Each of the hooks 40 and 46 extends upwardly to attach to an associated hinge 62 that mounts a lift gate or rear door 64 on the vehicle, best seen in FIG. 5. With the central portion 52 attached to the door striker 60, and the hooks 40 and 46 attached to respective hinges 62, the cable 32 is under tension and the wheel assembly 56 is retained in place in a vertical orientation within the vehicle passenger compartment 58.

Figure 6:
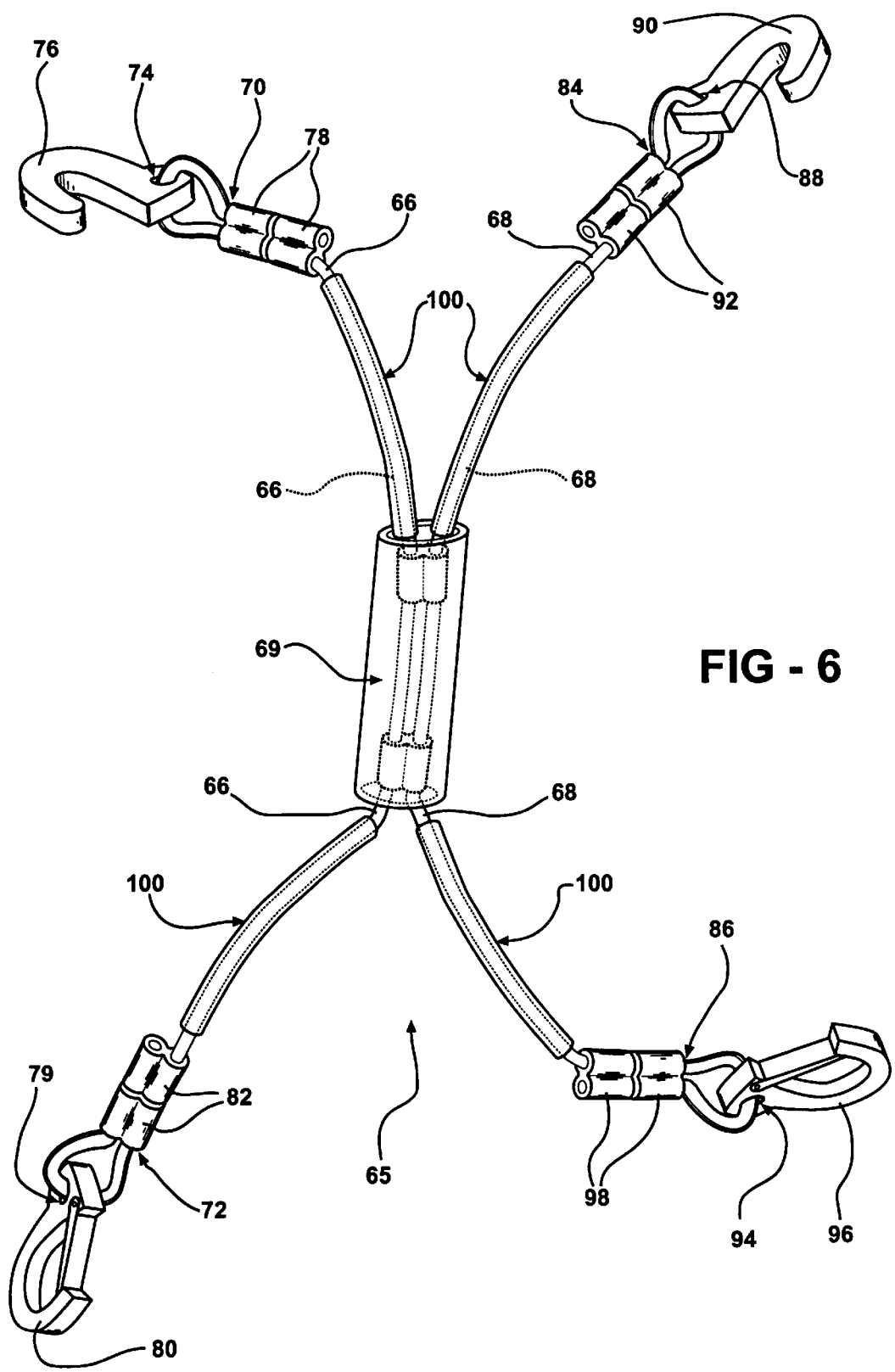
FIG. 6 is a perspective view of an alternative embodiment of a retaining apparatus in accordance with the present invention.

Referring now to FIG. 6, an alternative embodiment of a retaining apparatus in accordance with the present invention is indicated generally at 65. The retaining apparatus 65 includes an elongated first cable 66 and an elongated second cable 68 received and loosely connected by a generally tubular connector 69. The cables 66 and 68 are preferably constructed of rigid steel aircraft-type cable, or a cable of similar strength, quality, and flexibility. The first cable 66 includes a first end 70 and a second end 72. The first end 70 passes through an aperture 74 in a first hook 76 and is attached to itself by a plurality of cable clamps 78, attaching the first hook 76 to the first cable 66. The second end 72 passes through an aperture 79 in a first spring-loaded clip 80 and is attached to itself by a plurality of cable clamps 82, attaching the first spring-loaded clip 80 to the first cable 66. The second cable 68 includes a first end 84 and a second end 86. The first end 84 passes through an aperture 88 in a second hook 90 and is attached to itself by a plurality of cable clamps 92, attaching the second hook 90 to the second cable 68. The second end 86 passes through an aperture 94 in a second spring-loaded clip 96 and is attached to itself by a plurality of cable clamps 98, attaching the second spring-loaded clip 96 to the second cable 68. Thus, the apparatus 65 can be considered as the equivalent of the single cable 32 with the central portion 52 cut to form two cable portions such as the two cables 66 and 68.

In operation, the connector 69 is positioned in the central aperture of the wheel assembly (not shown) with the hooks 76 and 90 on the forward side of the wheel assembly and the clips 80 and 96 on the rearward side of the wheel assembly. The hooks 76 and 90 are operable to be attached to attachment points in a vehicle interior (not shown), such as the hinges 62 shown in FIGS. 3 and 5. The spring-loaded clips 80 and 96 are operable to be attached to other attachment points (not shown) in the vehicle interior such that the wheel assembly is maintained in a vertical orientation as shown in FIG. 3. Each cable 66 and 68 has a substantial portion thereof enclosed by a pair of flexible sheaths 100. The sheaths 100 are preferably constructed of transparent tubular plastic and provide a less harsh surface which the user of the retaining apparatus 65 can grasp in manipulating the retaining apparatus 65 to attach the hooks 76 and 90 and the spring-loaded clips 80 and 96 to the various attachment points in the vehicle interior. Alternatively, the sheaths 100 are a plastic coating that adheres to the exterior surface of the cables 66 and 68 and provides a less harsh surface which the user of the retaining apparatus 65 can grasp in manipulating the retaining apparatus 65 to attach the hooks 76 and 90 and the spring-loaded clips 80 and 96 to the various attachment points in the vehicle interior.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the present invention has been described for the purpose of retaining a tire and wheel assembly, those skilled in the art will appreciate that the present invention is not limited to retaining only tire and wheel assemblies and may be utilized to retain numerous components.

What is claimed is:

1. An apparatus for temporarily retaining a tire and wheel assembly within an vehicle passenger compartment, the passenger compartment having a plurality of attachment points disposed therein, the tire mounted to the wheel and the wheel having a center opening, said apparatus comprising:

at least one cable having, opposed ends, a portion of said cable adapted to be attached to an attachment point within the passenger compartment; and a means for attaching said ends of said at least one cable to corresponding attachment points within the vehicle passenger compartment, said cable and said means for attaching said ends of said cable being of a sufficient strength to withstand a predetermined force;

whereby when a one of said opposed ends of said cable is attached at a one attachment point within the vehicle passenger compartment and another of said opposed ends of said cable is attached at another attachment point within the vehicle passenger compartment and said portion of said cable is passed through the center opening of the wheel and attached to another attachment point within the vehicle passenger compartment, said cable is tensioned and retains the tire and wheel assembly within the vehicle passenger compartment.

2. The apparatus according to claim 1 wherein said cable is a rigid steel aircraft-type cable.

3. The apparatus according to claim 1 wherein said means for attaching is a pair of hooks attached to respective said ends of said cables.

4. The apparatus according to claim 1 wherein said portion of said cable includes a pair of spring-loaded clips for engaging the another attachment point.

5. An apparatus for retaining an automotive vehicle tire and wheel assembly in a vertical position within the vehicle passenger compartment adjacent a lift gate, the tire mounted to the wheel, the wheel having a center opening, said apparatus comprising:

at least one rigid steel aircraft-type cable having opposed ends, a portion of said cable adapted to be attached to a striker plate within the passenger compartment; and a hook attached to each of said ends of said at least one cable for attaching to respective hinges on the lift gate;

whereby when the tire and wheel assembly is positioned in the vertical position, a hook at a one end of said cable is attached at a one hinge and a hook at another end of said cable is attached at another hinge and said portion of cable adapted to be attached to plate striker plate is passed through the center opening of the wheel and attached at the striker plate, said cable is tensioned and retains the tire and wheel assembly in the vertical position.

6. The apparatus according to claim 5 including a tubular covering surrounding said portion of said cable.

7. The apparatus according to claim 5 including a plastic coating formed on said cable.

* * * * *